United States Patent [19]

Post

[11] Patent Number: 5,140,158
[45] Date of Patent: Aug. 18, 1992

[54] METHOD FOR DISCRIMINATIVE PARTICLE SELECTION

[75] Inventor: Richard F. Post, Walnut Creek, Calif.

[73] Assignee: The United States of America as represented by the United States Department of Energy, Washington, D.C.

[21] Appl. No.: 593,927

[22] Filed: Oct. 5, 1990

[51] Int. Cl.⁵ .............................................. H01J 49/34
[52] U.S. Cl. .................................... 250/281; 250/282; 250/287
[58] Field of Search .................. 250/282, 287, 281

[56] References Cited

U.S. PATENT DOCUMENTS 4,899,084  2/1990  Post ................................ 315/111.81

FOREIGN PATENT DOCUMENTS

368674  4/1969  U.S.S.R. ............................. 250/282

Primary Examiner—Jack I. Berman
Attorney, Agent, or Firm—Henry P. Sartorio; L. E. Carnahan; William R. Moser

[57] ABSTRACT

The invention is a method and means for separating ions or providing an ion beam. The invention generates ions of the isotopes to be separated, and then provides a traveling electric potential hill created by a sequential series of quasi static electric potential hills. By regulating the velocity and potential amplitude of the traveling electric potential hill ionized isotopes are selectively positively or negatively accelerated. Since the ionized isotopes have differing final velocities, the isotopes may be collected separately or used to produce an ion beam of a selected isotope.

18 Claims, 5 Drawing Sheets

METHOD FOR DISCRIMINATIVE PARTICLE SELECTION

The U.S. Government has rights in this invention pursuant to Contract No. W-7405-ENG-48 between the U.S. Department of Energy and the University of California, for the operation of Lawrence Livermore National Laboratory.

FIELD OF THE INVENTION

The invention relates to an improved method and apparatus for separating ions of chosen charge-to-mass ratios from other ions with a different charge-to-mass ratio. The precision obtained by the invention allows the invention to be used for isotope separation. In addition, the invention may be used to provide an ion source. By contrast to other, more specialized, techniques of isotope separation the subject invention is tunable to a wide spectrum of atomic species that are of commercial interest.

There exist many areas in modern technology where the separation of specific isotopes of certain atomic species is useful but where the cost of present separation technology is prohibitively high. An example is the separation of mercury isotopes. Here the intent is to change the normal isotopic mixture of mercury to an isotopic mixture of mercury with a higher concentration of rare mercury isotopes to provide a fluorescent lamp which requires less power and provides a brighter light. Though it is possible in principle to accomplish such a change through existing separator technology the cost is too high to make this approach attractive economically. There are also other examples where the existence of a flexible and relatively inexpensive technique for isotope separation would be valuable for commercial applications.

One of the first processes used to accomplish such isotope separations used a mass spectrometer or mass spectrograph. Such processes are typically expensive, and therefore they are not used for producing large quantities of separated isotopes.

Another method of separating isotopes is gaseous diffusion. Gaseous diffusion separation provides only a small change in concentration of the isotopes which are to be separated. For this reason, some gaseous diffusion facilities require several thousand individual stages cascaded together. Since so many stages are required, for many years approximately 10% of the total electric power output of the United States was required to operate three gaseous diffusion plants.

Another method of separating isotopes is chemical exchange. This process is based on the fact that if an equilibrium is established between two media, for example a substance in liquid phase and a substance in gaseous phase, the ratio between isotopes is different in one media than in another. One drawback of chemical exchange is that an isotope process using chemical exchange would be specific for a particular element. A chemical exchange process, in general, is not be useful for separating a variety of isotopes of a variety of elements.

The operation of the invention can be understood in terms of an analogy, the interaction of a lighter particle with the potential field of a moving much heavier particle. This circumstance is one of the classic problems in physics. A familiar example is the "slingshot" maneuver of a satellite directed to make a close encounter with the moon or another planet. In such an encounter the lighter particle (the satellite) gains (or loses) energy by interacting with the potential field of the heavier particle (the moon or a planet). This process is most easily understood by conceptually going to the frame of reference of the potential field of the moving heavier particle. In this frame of reference the lighter particle approaches the potential field of the heavier particle, is turned around, and moves away with the same speed as it had before.

Viewed now from a frame at rest we see that the lighter particle is now moving with a different velocity from what it had before the encounter. If the encounter is a colinear one (i.e. in 1-D), the new velocity will be given by the vector equation $$v_r = 2v_o - v_i, \quad (1)$$

where $v_r$ is the velocity of the lighter particle after reflection, $v_o$ is the velocity of the moving potential field, which moves with the heavier particle which generates the potential field, thus the heavier particle is also moving with a velocity $v_o$, and $v_i$ is the incident velocity of the lighter particle (all being referred to the "laboratory" frame of reference, which is the frame at rest). For example, if the lighter particle is initially at rest in the lab frame, it will be flung away following its encounter with the moving potential field of the moving heavier particle at exactly twice the velocity of that field. If the lighter particle is in motion parallel to the heavier particle at the time of its encounter with the potential field of the heavier particle, as indicated by equation (1), its velocity after the encounter will be $2v_o$ less its initial velocity. If overtaken by the heavier particle, its final energy will be greater than its initial energy, i.e. it will extract energy from the potential field of the heavier particle. On the other hand, if it overtakes the heavier particle from the rear it will be slowed down, i.e. it will deliver energy to the potential field of the heavier particle.

SUMMARY OF THE INVENTION

The present invention has as one of its objectives to enhance the applicability of isotope separation to a wide spectrum of atomic species, while at the same time reducing the capital and operating cost of the separator.

Another object of the invention is to provide an apparatus which is tunable to separate isotopes of a variety of elements.

Another object of the invention is to improve the electrical efficiency of the process of isotope separation, as a means of reducing its cost.

Another object of the invention is to provide an isotope separation device which utilizes "modular" separators, so as better to accommodate to the design and fabrication of separator plants of a variety of sizes and overall capital costs.

Another object of the invention is to provide ion sources within which the separation principle operates to select and extract a particular ion species, for example negatively charged ions, from a background containing electrons or other types of ions that are not of interest for the application at hand.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

The invention provides a method and apparatus for changing the percentage of a first plurality of molecules having a mass $\leq M_1$ in a gas which has an initial percentage of a first plurality of molecules and an initial percentage of a second plurality of molecules of molecules having a mass $\geq M_2$ where $M_2 > M_1$. The term "molecules" in the specification and claims also includes atoms. The invention ionizes molecules of the first plurality and the second plurality to the same charge. The invention induces among the ionized molecules at least one traveling electric potential hill wherein the amplitude and the velocity of the traveling electric potential hill is adjusted to be sufficient to provide a net positive or negative acceleration to some of the molecules of the first plurality while being insufficient provide a net positive or negative acceleration to some of the molecules of the second plurality so that the number of the first plurality of molecules which have a net acceleration divided by the total number of molecules of the gas which have a net acceleration make a percentage that is greater than the initial percentage of the first plurality of molecules. In the specification and claims, accelerating means to provide a net change in velocity which may be positive or negative, unless clearly expressed otherwise.

DETAILED DESCRIPTIONS OF THE PREFERRED EMBODIMENTS

Figure 1:
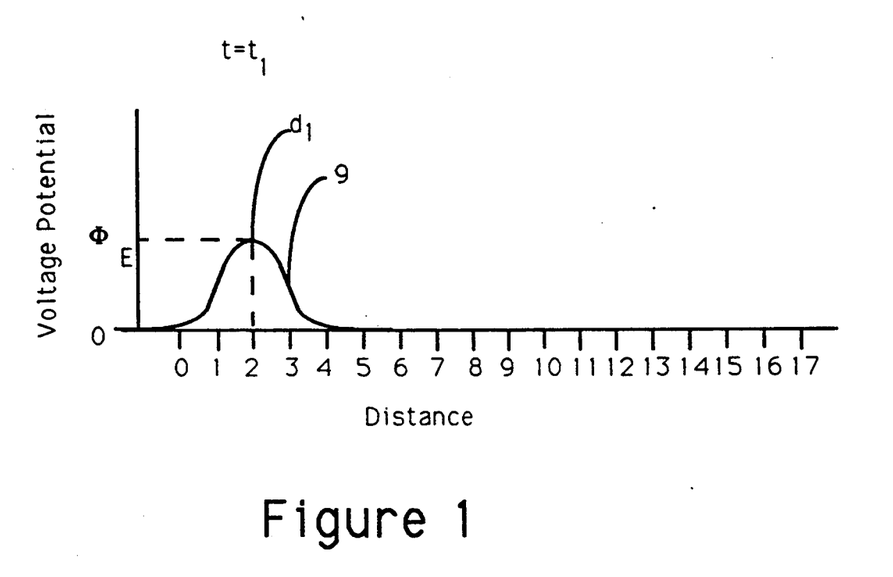
FIG. 1 is a graph of the voltage versus distance of a quasi static electric potential hill at time $t_1$.

FIG. 1 illustrates an electric potential hill 9 with a voltage potential amplitude of $\Phi_E$ at an instant of time $t_1$. At $t_1$ the inventive device is used to establish an electric field which causes the electric potential hill 9. At $t_1$ the electric potential hill 9 has a voltage potential near zero at a distance $d=0$, a voltage potential $=\Phi_E$ at $d_1 = 2$, and a voltage potential approaching zero at $d=4$.

Figure 2:
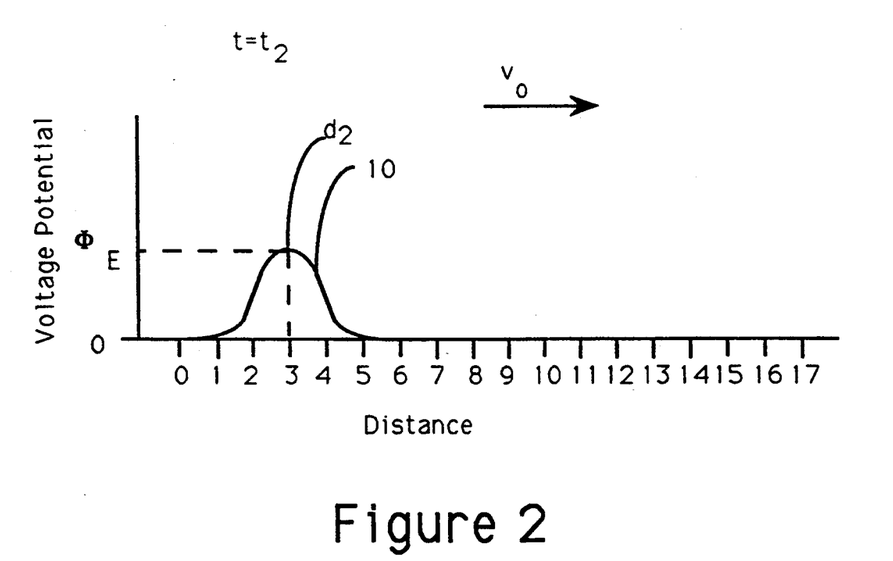
FIG. 2 is a graph of the voltage versus distance of a quasi static electric potential hill at time $t_2$.

FIG. 2 illustrates the electric potential hill 10 imposed by the inventive device at time $t_2$. At $t_2$ the electric potential hill 10 has a voltage potential near zero at $d=1$, a voltage potential $=\phi_E$ at $d_2=3$ and a voltage potential approaching zero at $d=5$.

FIGS. 1 and 2 illustrate how two quasi-static electric potential hills 9 and 10 can be made to simulate a traveling electric potential hill with a velocity $v_o$ such that:

$$v_o = (d_1 - d_2)/(t_1 - t_2)$$

The inventive apparatus continues to induce a series of localized electrical potentials which simulate a traveling electrical potential hill traveling at a velocity with a magnitude $v_o$.

At location $d=13$ an ion with a charge $Ze$ and a mass $M$ is located with an incident velocity $v_i$ of approximately zero. When the traveling electrical potential hill reaches the ion, it will interact with the ion according to equation 1 with the traveling electrical potential hill acting as the potential field of a moving heavier particle and the ion acting as the lighter particle. If the potential hill has a sufficiently high amplitude $\Phi_E$, the ion will gain a reflected velocity $v_r = 2v_o$, since in this example the ion was initially at rest. In that instance, the ion which had an initial kinetic energy of approximately zero, after interacting with the traveling potential hill would have a resulting kinetic energy $W_f = (\frac{1}{2})Mv_o^2$ in the frame of reference of the traveling electric potential hill. The amount of energy that the traveling electrical potential hill can put into the ion from the electrical potential hill placing an electrostatic push on the ion is $W_E = Ze\Phi_E$, wherein the charge $Ze$ of the ion is determined by the ionic charge $Z$ times the charge of an electron $e$. If $\Phi_E$, $Z$, $v_o$, and $M$ are chosen so that $(\frac{1}{2})Mv_8^3 > Ze\Phi_E$, then the amplitude of the electrical potential $\Phi_E$ is not high enough for the traveling electrical potential hill to impart the kinetic energy $W_f$ to the ion. Therefore, instead of the ion being reflected with a velocity with a magnitude $v_r = 2v_o$, the ion goes over the electrical barrier, leaving the ion unaffected by the traveling electric potential hill with a final velocity which is approximately zero.

From the above a ratio $\Gamma$ is set as $$\Gamma = (Ze\Phi_E)/((\tfrac{1}{2})Mv_o^2) \tag{2}$$

If $\Gamma = 1$, then the ion will not be reflected and will have a velocity equal to approximately zero. If $\Gamma > 1$, then the ion will be reflected and will have a reflected velocity:

$v_r 2v_o$ in the frame at rest.

In accordance with Equation 2, for a traveling electric potential hill with a selected amplitude $\Phi_o$ traveling at a set velocity $v_o$, the ratio of $Z/M$ is what will determine whether or not $\Gamma$ is greater than one, and therefore whether or not a reflected velocity with a magnitude $v_r = 2v_o$ will be imparted to the ion. Therefore in a system with a plurality of ions or charged particles at rest when a traveling electric potential hill passes through the system, for some constant $k = (2e\Phi_E)/(v_o^2)$, ions with a charge to mass ratio $Z/M > k$ will be accelerated to a velocity twice the velocity of the traveling electric potential hill while ions with a charge to mass ratio $Z/M < k$ will not be accelerated. Therefore when an traveling potential hill is applied, an ion or charged particle beam is created of ions or charged particles with a charge to mass ratio greater than k. By carefully choosing the charge to mass ratio $(Z/M)$ and the potential $\Phi_E$ it is possible to create specialized ion beams or to separate isotopes of ions, since different isotopes of an ion could have the same charge, but would have different masses.

Consider two isotopes with masses $M_1$ and $M_2$, with $M_1$ being less massive than $M_2$. Assume also that both isotopes are ionized to the same charge state, $Z = Z_1 = Z_2$, and are initially "at rest" (i.e. have a low kinetic temperature) within a low density plasma through which a traveling potential hill is propagated. If the speed of the hill and the height of the potential (relative to its value far from the peak) are adjusted so as to be just great enough to reflect and accelerate $M_1$, then the more massive particle, $M_2$, will pass over the electric potential hill as the electric potential hill passes and will be left behind (provided the precision of control over the amplitude and speed of the wave is sufficiently good for the mass-ratio involved). In such a situation the moving potential wave will "strip" the plasma of those ions for which $\Gamma > 1$, and leave behind those ions for which $\Gamma < 1$.

Furthermore, since the speed of the reflected particle will be approximately equal to $2v_o$, this fact can be used to improve the efficiency of separation process by collecting the selected ions at end of the system in a collector cup at a potential, $\Phi_c$, that is chosen so that the quantity $Ze\Phi_c$ is nearly equal to the kinetic energy of the selected ions. This technique can also be used to discriminate against the collection of any ions of higher charge state (but of closely similar or equal mass) than that of the desired particles. Ions of higher charge and closely similar masses will not have sufficient energy to penetrate the end-stopping potential. Even if their kinetic energy is close to, or equal to, that of the desired particles, their charge is too high, so that they cannot reach the collector.

Figure 3:
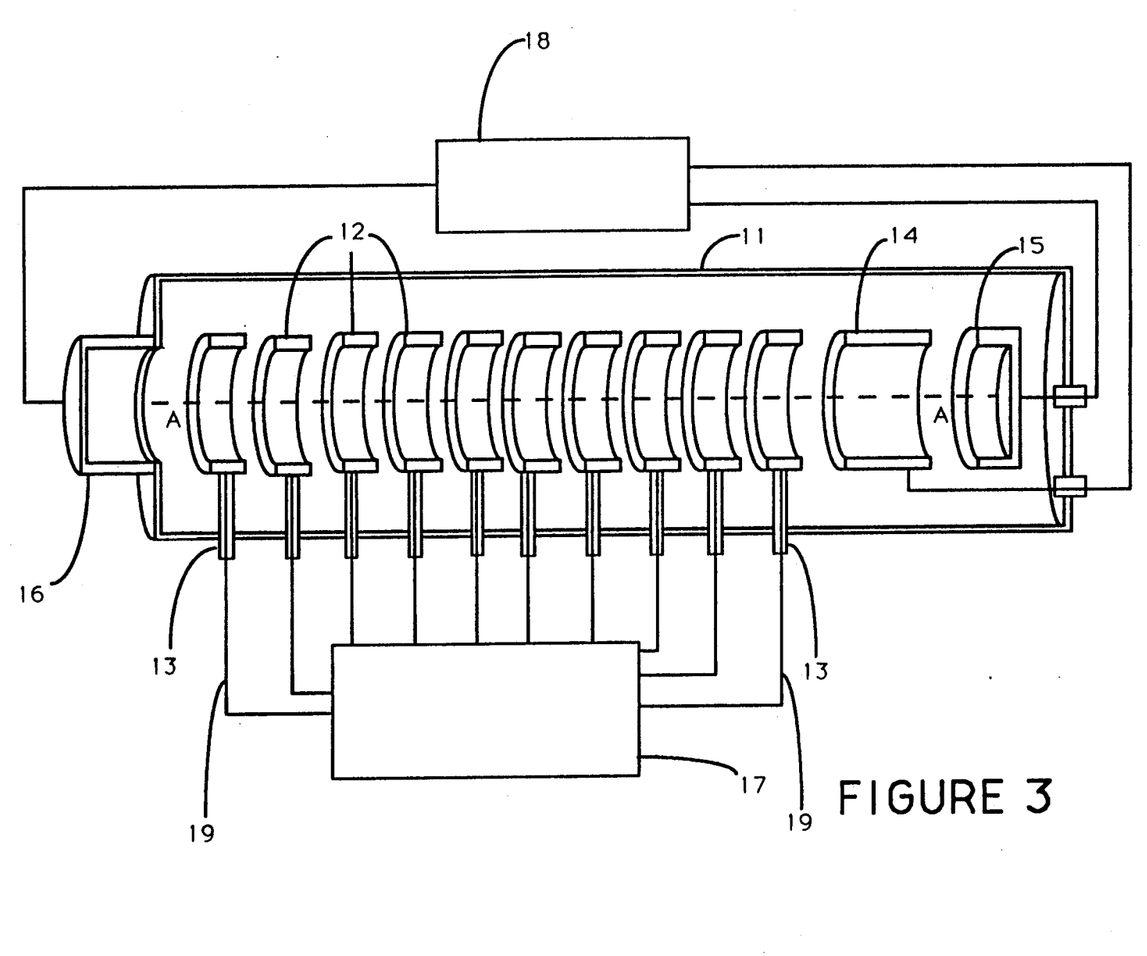
FIG. 3 is a cross-sectional view of an embodiment of the invention, which uses a plasma source.

FIG. 3 illustrates an embodiment of the invention, showing a cross-sectional view from the side of a single module of the invention. Inside a vacuum chamber 11 an array of short hollow cylindrical electrodes 12 with a central axis A—A are supported on insulated electrical feed-throughs 13. At a first end of the array is located a hollow cylindrical electrode 14 and a collector cup 15 which together comprise the collector assembly. At a second end of the array is located a means 16 for providing and maintaining a plasma along the center of the cylindrical electrodes 12. Connected to each coil 12 through the feed-through connections 13 is an electrical cable 19 coming from an electronic pulser chassis 17 that generates a repetitive sequence of pulses, which when applied to the electrodes 12 produces a traveling potential hill within the cylindrical volume formed by the interior of the aligned short cylindrical electrodes 12. Connected to electrode 14, collector cup 15, and plasma source 16 is power supply 18, which provides the various required operating voltages to those electrodes and to the plasma source 16.

In operation of this embodiment, plasma source 16 generates a plasma of ions with preferably very little velocity thus having a low kinetic temperature. In an example of the operation of this embodiment the ions are ions of Mercury $Hg^+$. The approximate percentages of natural abundance for mercury are $^{198}Hg$ at 10%, $^{199}Hg$ at 17%, $^{200}Hg$ at 23%, $^{201}Hg$ at 13%, $^{202}Hg$ at 30%, and $^{204}Hg$ at 7%. To separate out and collect $^{198}$ Hg, the electronic pulse chassis 17 sequentially pulses the cylindrical electrodes 12 to create a moving electronic potential hill with a velocity of magnitude $v_o$ with a direction along a first direction parallel to axis A—A. In this example M=198 atomic mass units, Z=1, and $e = -1.602 \times 10^{-19}$ coulombs. Therefore, $\Gamma = 1$, when $2(198 \text{ amu})/(-1.602 \times 10^{-19} \text{ coulombs}) = \Phi_E/v_o^2$. By choosing an electric potential hill amplitude $\Phi_E$ and hill velocity $v_o$ so that for M=198 amu $\Gamma > 1$ and for M=199 amu $\Gamma < 1$, the only singly charged mercury ions that will be accelerated by the traveling electric potential hill will be the $^{198}Hg$ isotopes. Mercury ions that have a +2 or greater charge will also be accelerated, since for these ions $\Gamma > 1$. Therefore the traveling electric potential hill caused by the sequential pulsing of the cylindrical electrodes 12 will accelerate all singly charged ions of $^{198}Hg$ and all higher charged mercury ions to a velocity with a magnitude of approximately $2v_o$ and a direction towards the collector cup 15 in the first direction. The steady state cylinder electrode 14 is positively charged to create a potential that will turn back any ion with a mass less than 210 amu and traveling at a velocity with a magnitude $< v_o$ or having a charge equal to or greater than +2 and traveling at a velocity with a magnitude of approximately $2v_o$ or less. Since the only singly charged ions that are accelerated to a velocity of $2v_o$ are $^{198}Hg$ isotopes, only $^{198}Hg$ isotopes will pass by the steady state electrodes 14 and be collected by the collection cup 15.

In the above embodiment there is a measure of resolution, which is how precise $\Phi_E$ must be to substantially separate one isotope from another. Given two particles which are to be separated, with masses $M_1$ and $M_2$, $\Phi_1$ and $\Phi_2$ are defined as:

$$\Phi_1 = ((\tfrac{1}{2})M_1 v_o^2)/Ze \text{ and}$$

$$\Phi_2 = ((\tfrac{1}{2})M_2 v_o^2)/Ze.$$

Here resolution will be defined as $R = \Phi_1/\Phi_2$, where $M_1 > M_2$.

In this embodiment $R = M_1/M_2$, since all other factors are equal and cancel out. In the above mentioned example, particle one would be $^{199}$ Hg and particle two would be $^{198}$ Hg giving a resolution of $R = 199/198 = 1.005$. This means the resolution of $\Phi_E$ needs to be about five parts in a thousand to provide the best separation between these particles. In addition higher thermal velocities tend to also diminish resolution.

Figure 4:
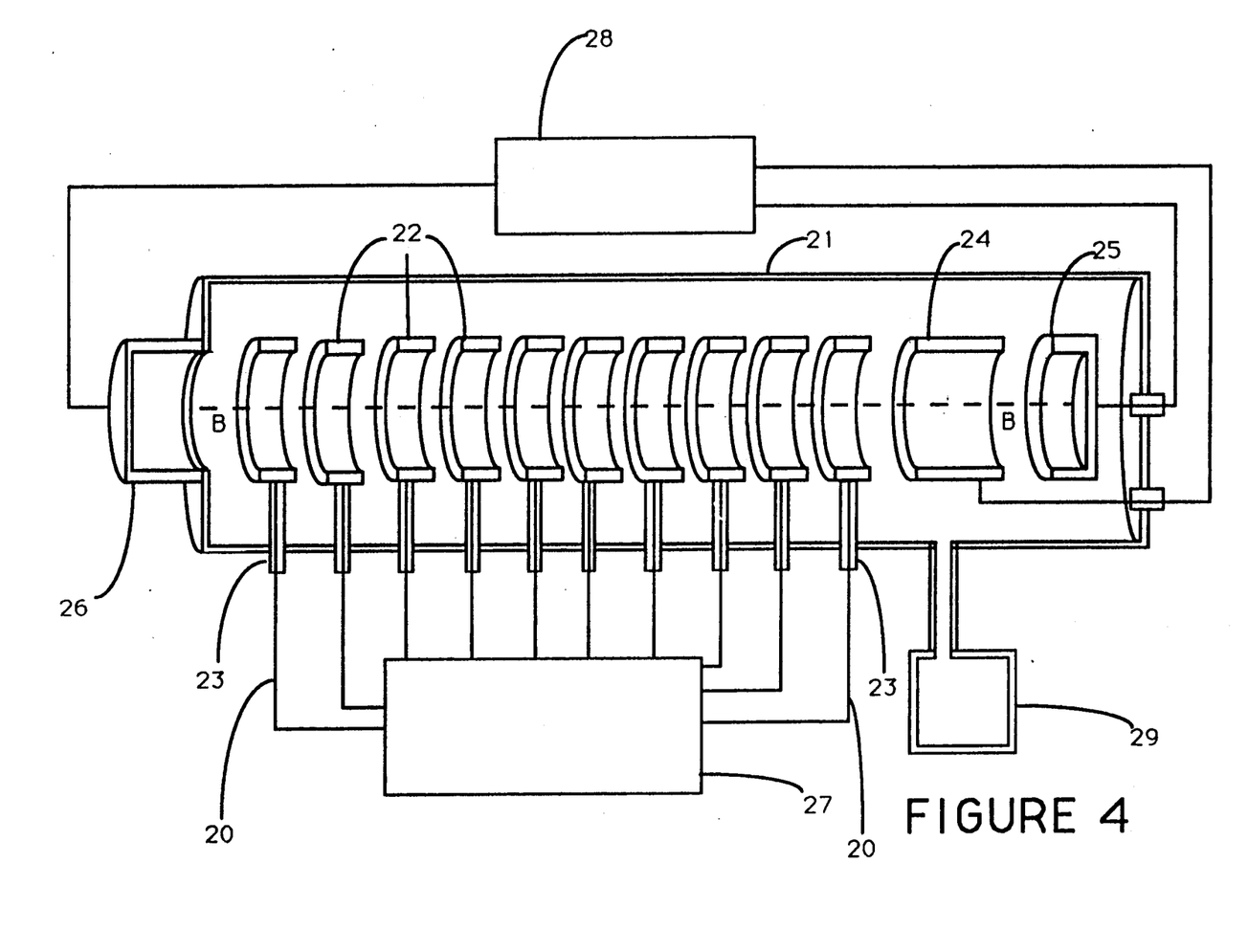
FIG. 4 is a cross-sectional view of an embodiment of the invention, which uses an ion source and accelerator.

FIG. 4 illustrates another preferred embodiment of the invention, showing a cross-sectional view from the side of a single module of the invention. A vacuum chamber 21 contains an array of short hollow cylindrical electrodes 22 supported on insulated electrical feed-throughs 23. At a first end of the array is located a hollow cylindrical electrode 24 and a collector cup 25 which together comprise the collector assembly. At a second end of the array is located an ion source and accelerator 26. The ion source and accelerator 26 contains the means to provide ions of an atomic species and accelerate the ions into the vacuum chamber 21. Connected to each short hollow cylindrical electrode 22 through the feed-through connections 23 is an electrical cable 20 coming from an electronic pulser chassis 27 that generates a repetitive sequence of pulses which, when applied to the electrodes 22, produces a traveling potential hill within the cylindrical volume formed by the interior of the short electrodes 22. Connected to electrode 24, collector cup 25, and ion source 26 is power supply 28, which provides the various required operating voltages to those electrodes 24,25 and to the ion source and accelerator 26. A vacuum system 29 is provided to maintain a vacuum in the vacuum chamber 21.

In the working of this embodiment of the invention, the ion source and accelerator 26 provides ions to the apparatus by accelerating the ions with an accelerating potential V. As a result, the ions of a charge Z enter the vacuum chamber 21 with an average initial kinetic energy $W_i = ZeV$, where e is the charge of an electron. The magnitude of the average initial velocity for each isotope $v_{in}$ can be calculated by the kinetic energy equation:

$$ZeV = W_i = (\tfrac{1}{2})M_n v_{in},$$

where $M_n$ is the mass of isotope n. The direction of the average initial velocities is along a first direction parallel to the axis B—B. In separating two particles with masses $M_1$ and $M_2$, with $M_1 > M_2$, since the ions are injected with an average initial velocity parallel to the velocity of the traveling electric potential hill, the amplitude of the electric potential hill can be reduced to $$\Phi_E(1-v_{i1}/v_o)^2 \leq \Phi_r \leq \Phi_E(1-v_{i2}/v_o)^2,$$

and merely be in the range where $\Phi_E$ would be the amplitude of the electric potential hill if the initial average velocities of the molecules were approximately zero as in the previous embodiment. Reducing the amplitude of the electric potential hill decreases the demands on the inventive apparatus, allowing for a simpler system. The resulting kinetic energy of the particles accelerated by the traveling electronic potential hill is $$W_m = 4W_o(1 - \tfrac{1}{2}(v_{in}/v_o))^2, \text{ where}$$

$$W_o = (\tfrac{1}{2})Mv_o^2.$$

In determining the resolution for separating two particles with masses $M_1$ and $M_2$, with $M_1 > M_2$, defining $\alpha = ZeV/((\tfrac{1}{2})M_1 v_o^2)$ and presuming that the velocity from the thermal kinetic energy is negligible, the resolution is:

$$R = \Phi_1/\Phi_2 = (M_1/M_2)((1-\alpha^{\tfrac{1}{2}})^2/(1-((M_1/M_2)\alpha)^2)) \quad (4)$$

When the accelerating potential V of the ion source and accelerator 26 is zero, $\alpha = 0$, In that case this embodiment becomes like the previous embodiment and $R = M_1/M_2$. In this embodiment $\alpha = 0.80$, for example. This means that the energy ZeV imparted to the particles by the ion source and accelerator 26 is 80% of the kinetic energy $(\tfrac{1}{2})Mv_o^2$ imparted to the particles by a traveling electric potential hill as described in the previous embodiment. Using the example of particles in the previous embodiment where $M_1/M_2 = 1.005$, $R = 1.049$. Where in the previous embodiment the resolution of $\Phi_E$ had to be five parts in a thousand, in this embodiment the resolution of $\Phi_r$ needs to be approximately five parts in a hundred. This difference in resolution provides a greater tolerance. This tolerance is important because an increase in thermal energy requires a greater tolerance. Thermal movement will diminish resolution, making the second embodiment more desirable in some instances.

In this embodiment since the magnitudes of the velocities of the particles as they are accelerated from the ion source and accelerator 26 are less than the magnitude of the velocity of the traveling electric potential hill $v_o$, the traveling electric potential hill overtakes the particle. Thus this is called the hill overtaking mode. When pre-acceleration is used, two distinct modes of separation may be employed in the same type of apparatus. These are: (1) the "hill overtaking" (H-O) mode, in which the magnitudes of the velocities of the pre-accelerated ions is less than that of the hill, and (2) the "particle overtaking" (P-O) mode in which the opposite is true. The differences between these two modes of operation appear in the details of the mass resolution and the energy efficiency. Both modes may, however, have the potential for better mass-resolving power and higher efficiency than the case of no pre-acceleration as in the first embodiment.

As the ions are continually added to the system, and the desired isotopes are stripped from the plasma, the remainder of the ions leak into the outer parts of the vacuum chamber 21 around the outside of the cylindrical electrodes 22 and are removed by the vacuum system 29.

There are also applications where it would be desirable to create the traveling potential within a plasma where the use of electrodes might be ineffective because of the screening effect of the plasma on externally applied electric fields. One technique would be to utilize the "Mirrortron" principle (U.S. Pat. No. 4,899,084 incorporated by reference) where a traveling electrical potential is generated by the application, from outside the plasma, of a traveling magnetic field. The effect of this traveling magnetic field is to cause a relative displacement of the plasma electrons relative to the ions, thus creating a local region of positive potential moving through the plasma. This moving potential could then either be used to "strip" the plasma of selected ions in situ, or ion beams could be injected into the end of the plasma to be selectively sorted by the moving space-charge field.

Figure 5:
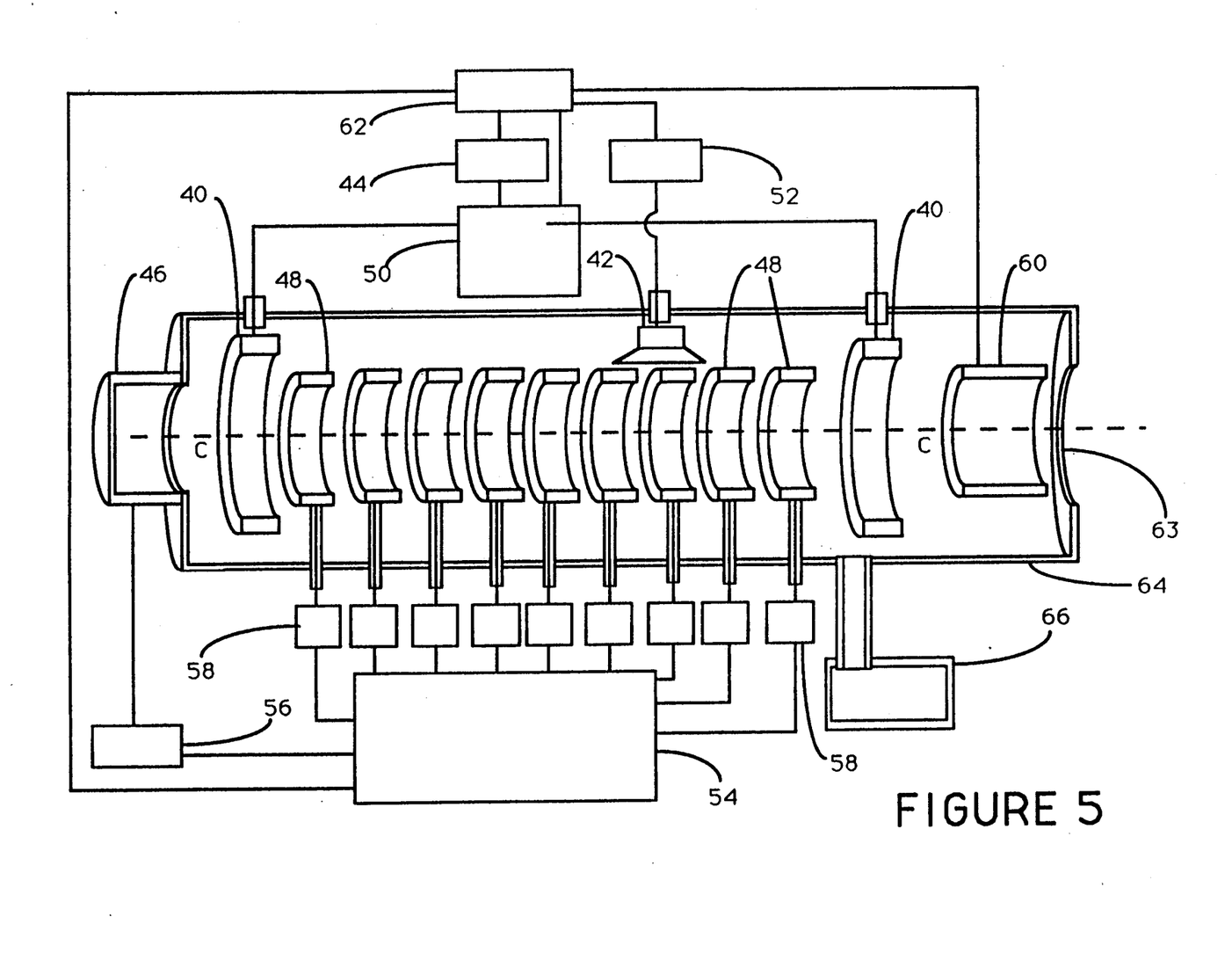
FIG. 5 is a cross-sectional view of an embodiment of the invention using a mirrortron.

FIG. 5 is an illustration of one embodiment of the invention, which utilizes a Mirrortron. In this embodiment, magnetic mirrors 40, which are magnetic coils in a ring, are used to create dc mirror cells in a magnetic mirror type magnetic field, which will be used to hold a hot electron plasma. Since this requires that the magnetic field created by the magnetic mirrors 40 be a continuous magnetic field the magnetic mirrors 40 are powered by a continuous power source 50. These magnetic mirrors 40 may have a mirror ratio on the order of two. A mirror ratio is defined as the ratio between the strongest point of the magnetic field along the magnetic mirror axis C—C and the weakest point of the magnetic field between the magnetic mirrors 40 and along the axis C—C. Microwave source 42 is positioned to create and heat a plasma of high energy electrons and lower energy ions held in the magnetic field. Since the microwave source 42 continuously provides energy to the plasma, the microwave source 42 is powered by a continuous power source 52. Additional heating could be accomplished by slow adiabatic magnetic compression of a pre-heated plasma using the magnetic mirrors 40 (or additional coils) in addition to or in place of the microwave source 42. Power source 44 adds a slowly increasing voltage to the dc component provided by power source 50 of the magnetic mirrors 40. The slowly increasing voltage slowly increases the magnetic field of the magnetic mirrors and the magnetic field between them, causing adiabatic compression. The plasma electrons would be heated to high temperatures and would typically be allowed to approach a collisional state such that its electron distribution function would attain a quasi-static loss-cone shape. The plasma density and electron temperature would be such as to cause only a minor perturbation of the confining fields.

The mirrortron also includes local coils 48, where each local coil is a magnetic coil in a ring shape. The local coils 48 are positioned between the magnetic mirrors 40 so that plasma confined by the magnetic mirrors 40 will pass through the center of the ring shaped local coils 48.

An ion or particle beam source and accelerator 46, located along the axis C—C, introduces a beam of ions or charged particles on a path along the axis C—C of the magnetic mirror at an average initial velocities $v_{in}$. Each local coil 48 is sequentially and rapidly pulsed up in current. The local coils 48 produce a local mirror, the height of which is comparable to, or larger than, that of the magnetic mirrors 40. As the local coil's field increases, hot electrons begin to be expelled from the region by the increasing field. On a sufficiently rapid time scale, however, the plasma ions would be essentially motionless, because of their heavy mass and low kinetic temperature. At this point the plasma quasineutrality constraint would step in; i.e., a positive potential would arise within the plasma of just such a magnitude as to preserve near equality between the electron and plasma ion density. The resulting positive space charge, which creates the positive potential, thereby accelerates the positively charged ions or charged particles in the injected beam. To selectively accelerate a specific type of ions or charged particles, the local coils 48 are pulsed sequentially to create a traveling electric potential hill with a velocity $v_o$. The local coils 48 are pulsed in order at a set speed, and the power source or switch 56 for the ion or particle beam source 46 is governed by a timer 54 which also controls the power sources or switches 58 for the local coils 48. An electrode 60 is charged and used to turn back ions that lack a threshold kinetic energy.

Timer or switch 62 controls timer 54 and power supplies 44, 50 and 52 to allow a cyclicly generated adiabatically compressed plasma. A vacuum chamber 64 surrounds the magnetic mirrors 40 and local coils 48, and a vacuum system 66 maintains the vacuum in the chamber 64 and removes the remaining ions as they leak through the magnetic bottle created by the magnetic mirrors 40.

To illustrate the operation of this embodiment and to illustrate the particle overtaking mode, this embodiment will be described as it is used in a particle overtaking mode. In the operation of this embodiment of the invention, ion source and accelerator 46 provides ions to the apparatus accelerated to an average initial velocities with components along axis C—C of $v_{in}$. To compare this embodiment with the previous embodiments the ions are also ions of Mercury $Hg^+$. To separate out $^{204}Hg$, the local coils are pulsed sequentially at a set rate so that the distance $\Delta d$ between adjacent local coils 48 and the time difference $\Delta t$ between the pulsing of adjacent coils is set so that $v_o = \Delta d / \Delta t$. In this example $M = 203$ atomic mass units, $Z = 1$, and $e = -1.602 \times 10^{-19}$ coulombs. Therefore, $\Gamma = 1$, when $$2(203 \ amu)/(-1.602 \times 10^{-19} \ coulombs) = \Phi_E/v_o^2.$$

By choosing a value $\Phi_E$ and hill velocity of magnitude $v_o$ so that for $M = 203$ amu $\Gamma > 1$ and for $M = 204$ amu $\Gamma < 1$, the only singly charged mercury ions that will be accelerated by the traveling electric potential hill will be the mercury isotopes with atomic masses less than 204. Mercury ions that have a +2 or greater charge will also be accelerated, since for these ions $\Gamma > 1$. The actual amplitude of the electric potential hill will be the reduced potential $\Phi_r$, since the average initial velocities are substantial, where $\Phi_r$ falls within the range $$\Phi_E(1 - v_{i204}/v_o)^2 < \Phi_r < \Phi_E(1 - v_{i203}/v_o)^2.$$

In the particle overtaking mode $v_o < v_i$. Therefore the particles overtake the traveling electric potential hill.

Mercury ions where $\Gamma > 1$ will be decelerated according to Equation 1, thus they will experience a negative acceleration. Mercury ions where $\Gamma < 1$ will be unaffected by the traveling potential hill and will maintain a velocity with a component parallel to axis C—C of approximately $v_{in}$. Since $v_o$ and $\Phi_E$ are chosen so $\Gamma \geq 1$ only for singly charged $^{204}Hg$, only $^{204}Hg$ will exit the separator and pass electrode 60 with an average velocity with a component along the axis C—C substantially equal to or greater than $v_{in}$. Since all other ions will have a velocities with components along the axis C—C much smaller than $v_{in}$, the electrode 60 will turn back all other ions. Only $^{204}Hg$ will pass through the electrode 60. This embodiment is designed with a port 63 to pass these ions to another system.

In the case where thermal energy is not neglected for two particles of mass $M_1$ and $M_2$, we define $\epsilon_1 = kT/ZeV$, with $kT$ being the kinetic temperature for particles $M_1$, and $\epsilon_2 = kT/ZeV$, with $kT$ being the kinetic temperature for particles $M_2$.

$$R = (M_1/M_2)((1 - \alpha^{\frac{1}{2}}(1 + (\tfrac{1}{2})\epsilon_1)^2)/(1 - (M_1/M_2)^{\frac{1}{2}}\alpha^{\frac{1}{2}}(1 + (\tfrac{1}{2})\epsilon_2)^2))$$

The invention is not critically dependent on the particular method used to generate a traveling potential hill. Some of the more important parameters are: (1) that the hill should be limited in range (i.e. it should fall off with distance from its peak to a small fraction of its peak value in a distance short compared to the length of the separator column), and, (2) that the amplitude and velocity of the electric potential hill should be sufficiently constant to not compromise the degree of mass resolution that is desired. In the specification and claims a potential hill is defined as having a magnitude which falls off with distance from its peak to a small fraction of its peak value (or amplitude) in a distance which is short compared to the length of the separator column.

Because thermal energy diminishes resolution and amplitude and velocity of the electric potential hill cannot be kept completely constant, separation will not be 100%. In the first embodiment, instead of yielding 100% $^{198}Hg$, the system need only enough resolution to increase the concentration of $^{198}Hg$ from 10% to 20% and possibly slightly increasing the concentration of $^{199}Hg$ from 17% to 20%. This would result in a diminished concentration of $^{204}Hg$ to 30%. In naturally occurring concentrations of mercury, 30% of the photons generated in a mercury lamp can be self absorbed by 30% of the mercury gas, since $^{204}Hg$ makes up 30% of the mercury gas in naturally occurring concentrations. By lowering concentrations of the highest concentration of isotopes, self absorption is lowered allowing for a more energy efficient light bulb.

Another method of practicing the invention would be to use the embodiment illustrated in FIG. 5 in the particle overtaking mode to significantly increase the concentration of $^{204}Hg$ to 50%, and then as the selected ions pass through the port 63 they pass to the embodiment illustrated in FIG. 2 with an average initial velocities with magnitudes of approximately $v_{in}$. The embodiment illustrated in FIG. 4 is set to wave overtaking mode to increase the concentration of $^{198}Hg$ to 18% and diminishing concentrations of $^{204}Hg$ and $^{202}Hg$ to 18%.

Figure 6:
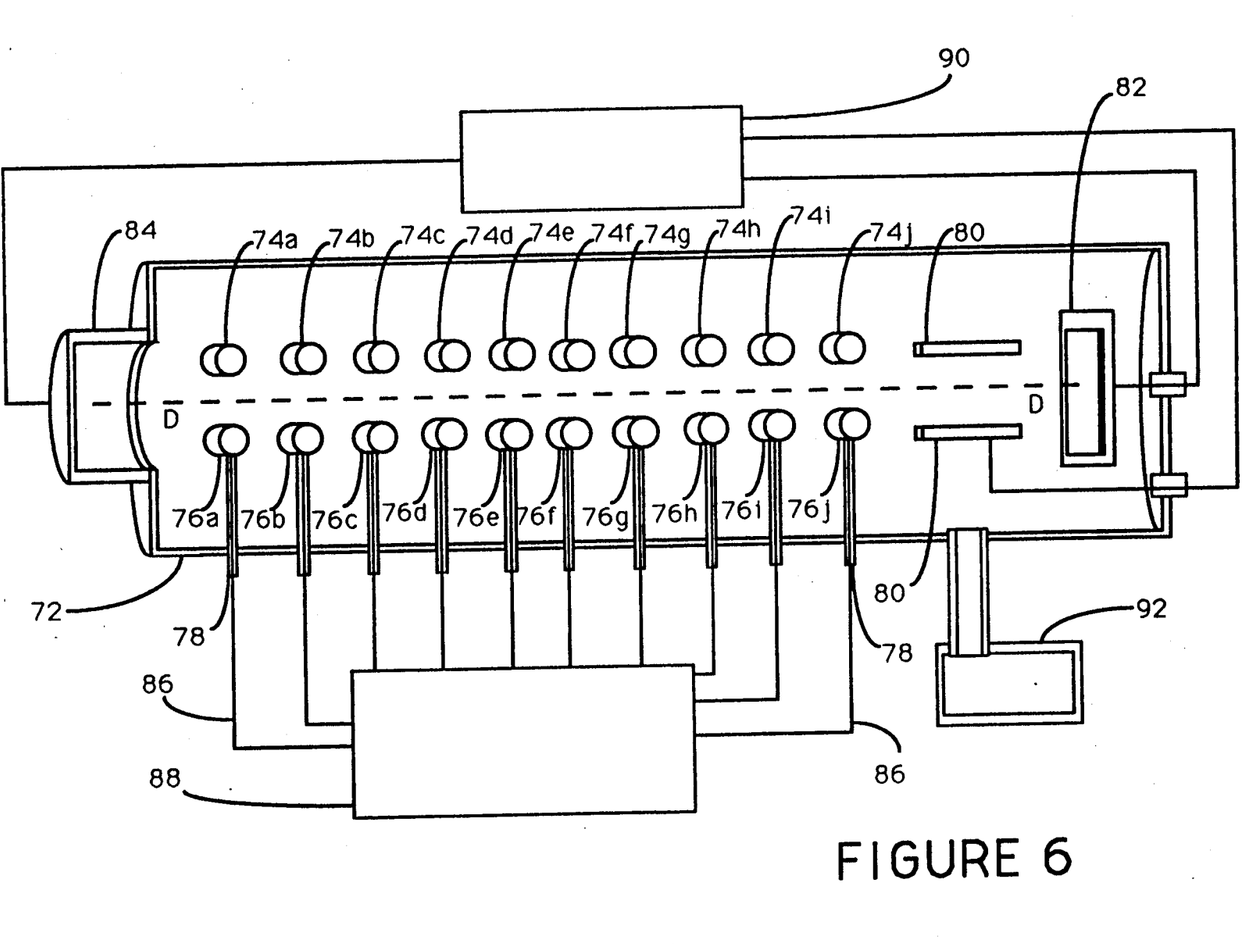
FIG. 6 is a cross-sectional view of an embodiment of the invention using conducting rods.

FIG. 6 illustrates another preferred embodiment of the invention, showing a cross-sectional view from the side of a single module of the invention. A vacuum chamber 72 contains an array of conducting rods 74a–j, 76a–j supported on insulated electrical feed-throughs 78. At a first end of the array are located a pair of parallel plate electrodes 80 and a collector cup 82 which together comprise the collector assembly. At a second end of the array is located an ion source and accelerator 84. This ion source and accelerator 84 contains the means to provide ions of an atomic species and accelerate the ions into the vacuum chamber 72. Connected to each electrode 74, 76 through the feed-through connections 78 is an electrical cable 86 coming from an electronic pulser chassis 88 that generates a repetitive sequence of pulses which, when applied to the electrodes 74, 76 produces a traveling potential hill within the space formed between the electrodes 74,76. The cabling from pulser chassis 88 to conducting rods 74a–j is not shown for clarity. The traveling hill is formed by first charging a first set of electrodes 74a and 76a to a set positive charge. After the first set of electrodes 74a, 76a begin to charge, a second set of electrodes 74b, 76b begins to charge. After the first set of electrodes 74a, 76a reaches a maximum charge the first set of electrodes 74a, 76a begins to discharge. During this time a third set of electrodes 74c, 76c begins to charge. The sum of the charges of the electrodes form a traveling electric potential hill as shown in FIG. 1 but with an amplitude $\Phi_r$. Connected to the parallel plate electrodes 80, the collector cup 82, and the ion source 84 is a power supply 90, which provides the various required operating voltages to those electrodes and to the ion source. A vacuum system 92 is provided to maintain a vacuum in the vacuum chamber.

In the operation of this embodiment of the invention, ion source and accelerator 84 provides ions to the apparatus by accelerating the ions with an accelerating potential V and injecting them into the vacuum chamber with an average initial kinetic energy $W_i = ZeV$, producing a thin plasma sheet between electrodes 74 and 76. In this example, the two isotope to be separated are Neon 22 ($^{22}$Ne) and Neon 20 ($^{20}$Ne). For an accelerating potential V=600 eV, the magnitude of the average initial velocities $v_{in}$ can be calculated from the equation $ZeV = W_i = (\frac{1}{2})M_n v_{in}^2$. For $^{22}$Ne, (600 eV)(1.602×10$^{-19}$) = ($\frac{1}{2}$)(22/(6.02472×10$^{-23}$))($v_{i22}$)$^2$. Therefore, for $^{22}$Ne $v_{i22} = 7.256 \times 10^6$ cm/s. Using the same equation for Neon 20, $v_{i20} = 7.610 \times 10^6$ cm/s. The amplitude of the traveling potential hill is set to accelerate both isotopes. The direction of the average initial velocities is along a first direction from the ion source and accelerator 72 and substantially parallel to axis D—D. In this example the magnitude of the velocity of the traveling potential hill $v_o = 10^7$ cm/s. The direction of the velocity of the traveling potential hill is parallel to the first direction. For $^{20}$Ne, we find $W_o = 1.03605$ keV. For $^{22}$Ne, $W_o = 1.13966$ keV. Using the equation $W_{fn} = 4W_o(1-(\frac{1}{2})(v_{in}/v_o))^2$, for $^{20}$Ne, $W_{f20} = 1.590$ keV. For $^{22}$Ne, $W_{f22} = 1.851$ keV. By applying a charge on the parallel plate electrodes 80 so that singly charged particles with a final kinetic energy less than 1.750 keV are turned back, only $^{22}$Ne ions will pass to the collector cup 82.

In this embodiment, pairs of conducting rods are used as electrodes 74, 76 instead of the hollow cylindrical electrodes. The rods have a length into and out of the page of FIG. 6. Such rods provide an even potential through the thickness of a thin plasma sheet which may have any desired length in the direction of the length of the rod.

The separation of krypton isotopes is used in another method of using the embodiment illustrated in FIG. 6. Naturally occurring krypton isotopes are $^{78}$Kr, $^{80}$Kr, $^{82}$Kr, $^{83}$Kr, $^{84}$Kr, and $^{86}$Kr. This preferred method allows the collection of $^{80}$Kr.

In this embodiment, ion source and accelerator 84 provides singly ionized krypton isotopes accelerated to 10 keV into the vacuum chamber 72. For $^{78}$Kr, $v_{i78} = 1.5732 \times 10^7$ cm/s. For $^{80}$Kr, $v_{i80} = 1.5534 \times 10^7$ cm/s. For $^{82}$Kr, $v_{i82} = 1.5347 \times 10^7$ cm/s. For isotopes heavier than $^{82}$Kr, $v_{i82} < < 1.5347 \times 10^7$ cm/s. The traveling potential hill generated by the conducting rods 74, 76, has a velocity $v_o = 2 \times 10^7$ cm/s. For $^{78}$Kr, $W_{o78} = 16.163$ keV. When $\Gamma = 1$, $\Phi_{En} = ((\frac{1}{2})M_n v_{in}^2)/Ze = W_{on}/Ze$. Since the minimum $\Phi_m = \Phi_{En}(1 - v_{in}/v_o)^2$, then the minimum $\Phi_m = (W_{on}(1 - v_{in}/v_o)^2)/Ze$. Since the charge on the ions is +1, Ze=1.Therefore the minimum amplitude of the potential hill for accelerating singly charged $^{78}$Kr ions $\Phi_{r78} = 0.73606$ kV. For $^{80}$Kr, $W_{o80} = 16.578$ keV. The minimum amplitude of the potential hill for accelerating singly charged $^{80}$Kr ions $\Phi_{r80} = 0.82663$ kV. For $^{82}$Kr, $W_{o82} = 16.992$ keV. For isotopes heavier than $^{82}$Kr, $W_{o82} <> 16.992$ keV. The minimum amplitude of the potential hill for accelerating singly charged ions Krypton isotopes of atomic mass 80 or greater is $\Phi_r 80 \geq 0.91971$ kV. In this embodiment the amplitude of the traveling potential hill is set as $\Phi_R = 0.8500$. As a result only the $^{78}$Kr and $^{80}$Kr isotopes are accelerated by the traveling potential hill to a kinetic energy $W_{fn}$ specified above. The remaining isotopes $^{82}$Kr, $^{83}$Kr, $^{84}$Kr, and $^{86}$Kr are not accelerated by the travling potential hill and maintain their initial kinetic energy of 10 keV.

In this example, the parallel plate electrodes 80 are charged with a potential of +15 keV. Since isotopes with a mass equal to or greater than $^{82}$Kr are unaccelerated by the traveling potential hill, they have a kinetic energy of 10 keV and therefore are turned back by the +15 keV potential created by the parallel plate electrodes 80. Since $^{78}$Kr and $^{80}$Kr have a final energy greater than 15 keV, these isotopes will pass between the parallel conducting plates 80. They will first be negatively accelerated by the potential from the plates and then positively accelerated back to their final kinetic energy $W_{fn}$ yielding a zero net acceleration from the parallel plate electrodes 80. The collector cup 82 is charged with a potential +24.5 keV. Since for $^{78}$Kr $W_{f78} < +24.5$ keV, $^{78}$Kr isotopes will not have enough kinetic energy to reach the collector cup 82 and will not be collected at the collector cup 82. Since for $^{80}$Kr $W_{f80} > +24.5$ keV, $^{80}$Kr isotopes will have enough kinetic energy to reach the collector cup 82 and will be collected at the collector cup 82. By using a combination of methods described in the previous embodiments, an isotope which is neither the heaviest or lightest can be selectively collected.

The foregoing description of preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for changing the percentage of a first plurality of molecules having a mass $\leq M_1$ in a gas which has an initial percentage of the first plurality of molecules having a mass $\geq M_2$ where $M_2 > M_1$, comprising the steps of:

ionizing molecules of the first plurality and the second plurality; and inducing among the ionized molecules an isolated traveling electric potential hill with a velocity with a magnitude $v_o$ and a direction in a first direction wherein the amplitude $\Phi$ of the traveling electric potential hill is sufficient to provide a net acceleration to some of the first plurality of molecules and insufficient to provide a net acceleration to some of the second plurality of molecules wherein the number of molecules of the first plurality which have a net acceleration divided by the total number of the first plurality and second plurality which have a net acceleration yields a percentage which is greater than the initial percentage of the first plurality;

inducing a static electric field along the first direction from the traveling electric potential hill wherein the step of accelerating the ionized molecules accelerates the ionized molecules to average velocities with components in the first direction $> v_o$ and wherein the static electric field has a potential sufficient to turn back molecules which experience a negligible net acceleration from the induced electric potential hill.

2. A method as claimed in claim 1, further comprising the step of collecting accelerated molecules of the second plurality which pass through the static electric field.

3. A method as claimed in claim 1, wherein the step of ionizing molecules, comprises the steps of, providing a gas of the first plurality and second plurality of molecules, and generating a plasma from the gas.

4. A method as claimed in claim 1, further comprising the step of accelerating the first and second plurality of ionized molecules along the first direction before inducing the traveling electric potential hill.

5. A method as claimed in claim 4, further comprising the step of collecting ionized molecules of the second plurality which pass through the static electric field.

6. A method as claimed in claim 1, wherein the step of inducing an isolated traveling electric potential hill, comprises the step of generating a series of isolated transient electrical potentials in a sequential manner along the first direction.

7. A method as claimed in calim 6, wherein the step of generating a series of isolated transient electrical potentials comprises the step of placing a positive charge on a series of electrodes surrounding the ionized molecules wherein the electrodes are aligned sequentially along the first direction and wherein the electrodes are sequentially pulsed along the first direction wherein the separation between an electrode and a next subsequent electrode is d and the difference in time t is the difference in time between the initiation of a pulse in the electrode and the initiation of a pulse in the next subsequent electrode wherein $d/t = v_o$.

8. A method as described in claim 1, further comprising accelerating some of the first plurality of ionized molecules to a first average initial velocity with a component in the first direction $v_{i1}$ and some of the second plurality of ionized molecules to a second average initial velocity with a component in the first direction $v_{i2}$, and ionizing some of the first plurality and second plurality of molecules to a charge of $Ze$, and wherein there are values $M$ and $v_i$ such that $M_1 \leq M \leq M_2$ and $v_{i2} \leq v_i \leq v_{i1}$ and $(\frac{1}{2})Mv_o^2(1 - v_i/v_o)^2 = Ze\Phi$.

9. A method as claimed in claim 8, further comprising the step of inducing a static electric field along the first direction from the traveling electric potential hill and wherein the static electric field has a potential greater than $(\frac{1}{2})M_2v_{i2}^2/Ze$ wherein accelerated molecules of the first plurality pass through the static electric field and unaccelerated molecules of the second plurality do not pass through the static electric field, and wherein the accelerated particles of the first plurality approaching the static electric field have a velocity with a velocity component in the first direction, wherein the velocity component is substantially equal to $v_r$ wherein $v_r = 2v_o - v_{il}$.

10. A method as claimed in claim 9, wherein some of the first plurality form a third plurality of molecules with a mass $M_3 < M_1$ which are also ionized and accelerated, wherein the collecting of accelerated molecules of some of the first plurality comprises charging the collection means to a potential $\Phi_c$ wherein $\frac{1}{2}M_3v_r^2 < \Phi_c/Ze < \frac{1}{2}M_1v_r^2$.

11. A method as claimed in claim 8, wherein $v_o < v_{il}$ and some of the first plurality of molecules experience a net negative acceleration from the traveling electric potential hill, and wherein the particles of the first plurality which experience a net negative acceleration have a resulting velocity with a velocity component in the first direction, wherein the velocity component is substantially equal to $v_r$ wherein $v_r = 2v_o - v_{il}$, and further comprising the step of inducing a static electric field along the first direction from the traveling electric potential hill and wherein the static electric field has a potential greater than $(\frac{1}{2})M_1v_r^2/Ze$ wherein molecules of the second plurality pass through the static electric field and molecules of the first plurality which experience a net negative acceleration do not pass through the static electric field.

12. A method for separating a first plurality of molecules having a mass $\leq M_1$ from a second plurality of molecules having a mass $\geq M_2$ where $M_2 > M_1$, comprising the steps of:

ionizing molecules of the first and the second plurality to a charge of $Ze$; and inducing among the ionized molecules an isolated traveling electric potential hill wherein the amplitude $\Phi$ of the traveling electric potential hill in a first direction is sufficient to provide a net acceleration of molecules of the first plurality and insufficient to provide a net acceleration of molecules of the second plurality.

13. An apparatus for changing the percentage of a first plurality of molecules having a mass $\leq M_1$ in a gas which has an initial percentage of the first plurality of molecules and an initial percentage of a second plurality of molecules having a mass $> M_2$ where $M_2 > M_1$, comprising:

an ionized molecule region with a first end and a second end wherein the second end is located along a first direction from the first end;

means for ionizing molecules of the first plurality and the second plurality to a charge $Ze$ and for providing the ionized molecules to the ionized molecule region; and means for inducing in the ionized molecule region an isolated traveling electric potential hill wherein the traveling potential hill has a velocity component parallel to the first direction of $v_o$ and an electric potential amplitude $\Phi$ wherein the amplitude $\Phi$ of tne electric potential hill is sufficient to provide a net acceleration to some of the first plurality of molecules and insufficient to provide a net acceleration to some of the second plurality of molecules wherein the number of molecules of the first plurality which have a net acceleration divided by the total number or the first plurality and second plurality which have a net acceleration yields a percentage which is greater than the initial percentage of the first plurality.

14. An apparatus as recited in claim 13, wherein the means for inducing an isolated traveling electric potential hill comprises a means for generating a series of isolated quasi static electrical potentials in a sequential manner along the first direction.

15. An apparatus as claimed in claim 14, further comprising means for inducing a static electric field along the first direction from the traveling electric potential hill at the second end of the ionized molecule region wherein the static electric field allows some of the ionized molecules to pass through the static electric field and prevents some of the ionized molecules from passing through the static electric field.

16. An apparatus as claimed in claim 15, further comprising means for collecting ionized molecules which pass through the static electric field, and means for accelerating ionized molecules to average initial velocities with a component in the first direction before they enter the first end of the ionized molecule region.

17. An apparatus as claimed in claim 15, wherein the means for generating a series of transient electrical potentials in a sequential manner along the first direction, comprises a plurality of electrodes surrounding the ionized molecule region wherein the electrodes are aligned sequentially along the first direction and a means for sequentially pulsing the electrodes along the first direction so that the electrodes are charged with a positive charge and wherein the separation between an electrode and a next subsequent electrode is d and the difference in time t is the difference in time between the initiation of a pulse in the electrode and the initiation of a pulse in the next subsequent electrode wherein $d/t = v_o$.

18. An apparatus as claimed in 15, wherein the means for generating a series of transient electrical potentials in a sequential manner along the first direction, comprises;

means for generating a plasma in the area of the ionized molecules;

means for confining the plasma in the ionized molecule region;

means for heating the plasma; and a plurality of ring shaped local coils surrounding plasma wherein the local coils are aligned sequentially along the first direction and a means for sequentially providing a current to the local coils along the first direction so the local coils provide a magnetic field creating a positive charge in the plasma near the local coil and wherein the separation between a local coil and a next subsequent local coil is d and the difference in time t is the difference in time between the initiation of a magnetic field in the local coil and the initiation of a magnetic field in the next subsequent local coil wherein $d/t = v_o$.

* * * * *